F. POOLE.
LIQUID HEATER.
APPLICATION FILED FEB. 2, 1915.
1,197,061. Patented Sept. 5, 1916.
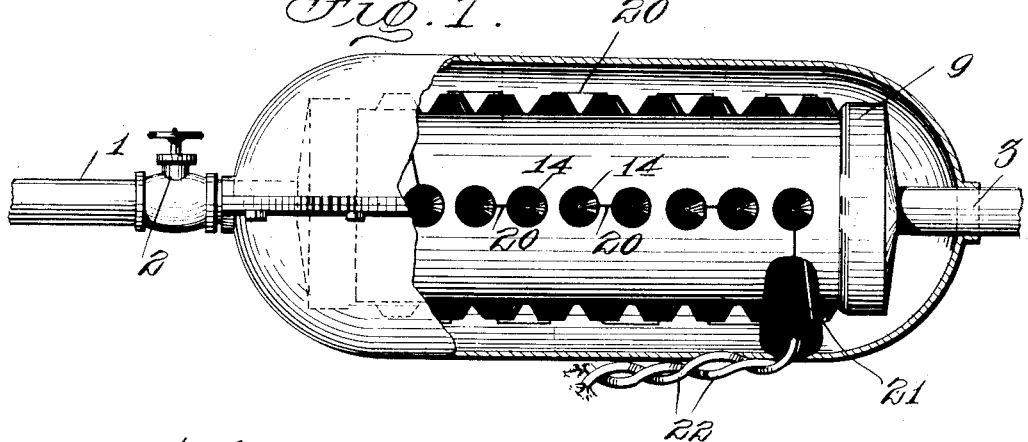
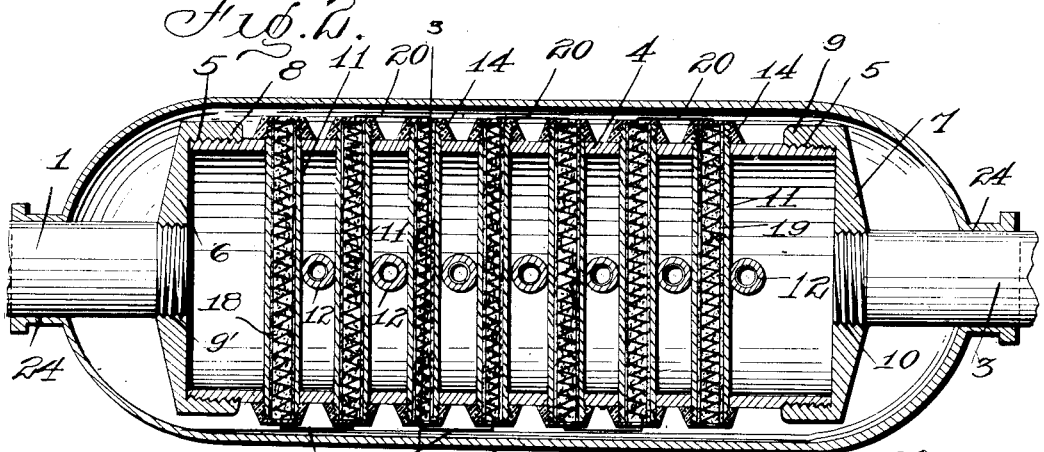
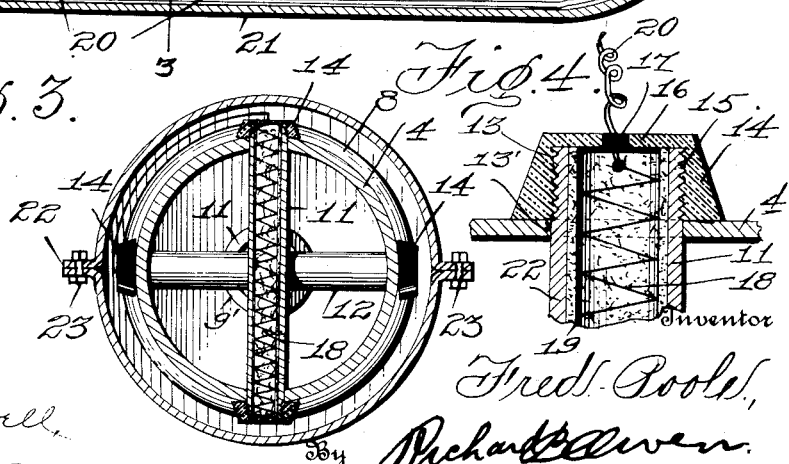
Witnesses
Inventor
Fred. Poole,
By Richard B. Owen.
Attorney

UNITED STATES PATENT OFFICE.

FRED POOLE, OF JEWELL, KANSAS.

LIQUID-HEATER.

1,197,061.     Specification of Letters Patent.     Patented Sept. 5, 1916.

Application filed February 2, 1915. Serial No. 5,740.

*To all whom it may concern:*

Be it known that I, FRED POOLE, a citizen of the United States, residing at Jewell city, in the county of Jewell and State of Kansas, have invented certain new and useful Improvements in Liquid-Heaters, of which the following is a specification.

This invention relates to liquid heaters, and more particularly to that class of liquid heaters which are commonly known as "instantaneous," the heater being interposed preferably in a water conduit or the like, the water passing through the heater and contacting with the heating members or elements 2.

The primary object of my invention is to provide an electric heating member capable of disposition in a water conduit or the like in such a manner that liquid passing through the conduit will be deflected from its course and caused to circulate in contact with a plurality of electric heating units mounted in a chamber containing the same.

Another object of my invention is to provide a heater of the above-mentioned character in which the heating elements may be readily removed therefrom for repair or renewal.

A still further object of my invention is to so mount the heating elements within the casing or chamber that the point of intersection of said heating elements will fall substantially in alinement with the longitudinal axis of the device and in the path of the flow of liquid therethrough.

A still further object of my invention is to provide an improved casing for supporting said heating elements, said casing being readily capable of disposition at any point in a pipe line. A protective shell is provided embracing the device to prevent accidental contact with the electrical connections associated therewith.

With the above and other objects in view my invention resides preferably in the construction, combination, and arrangement of parts as hereinafter set forth in the specification and illustrated in the accompanying drawing, in which—

Figure 1 is a side elevation of my improved water heater showing the same as mounted when in use, the protective shell being broken away. Fig. 2 is a longitudinal sectional view of the same, the protective shell being also shown in section. Fig. 3 is a transverse sectional view taken on the line 3—3 of Fig. 2 and looking in the direction of the arrows; and Fig. 4 is a detail sectional view of one of the joints between the heating casing and the heating elements carried therein.

Similar reference characters indicate similar parts throughout the various views of the drawing.

My improved water heater comprises preferably the construction shown in the drawings and hereinafter described in detail, the same being illustrated in conjunction with a water conduit indicated at 1, controllable by a valve 2, a continuation of the conduit being indicated at 3.

I provide a casing 4 substantially cylindrical in configuration, the said casing being externally threaded adjacent its opposite ends as indicated at 5. Closures are provided for the open ends of said cylindrical casing 4 which comprise caps 6 and 7 which are provided with flanges 8 and 9, respectively, for engagement with the threaded portions 5 of the cylindrical casing 4. Each of the caps 6 and 7 are provided with threaded apertures for engagement with the respective portions 1 and 3 of a conduit as indicated at 9' and 10, respectively. From the above it will be seen that liquid will, during the course of its flowing, pass through the casing 4.

The heating elements which I provide in this form of my invention comprise preferably a plurality of sets of tubular members 11 and 12, certain of said tubular members being alternately angularly disposed within the casing 4, and both of said sets of heating elements being disposed diametrically relative to the casing. All of the heating elements are substantially alike in construction, and I will therefore only describe one of them, their relative positions being illustrated to advantage in Figs. 2 and 3. The tubular members 11 and 12 are substantially alike, said tubular members having the opposite ends thereof threaded externally as indicated at 13 and extending beyond the periphery of the wall of the casing 4 through apertures 13' for reception of retaining burs or nuts 14, said nuts 14 being of any desired material, but preferably of an insulating material as indicated to advantage in the drawing. The said nuts 14 are threaded internally for an obvious purpose, the threaded apertures indicated at 15 terminating short of the length of the nut to provide a closing wall 16. The closing wall 16 is provided with a centrally located opening 17 to allow of passage therethrough and retention therein of an electrical conductor for affording electrical communication to the heating units contained within the tubular members 11 and 12, the said heating units being designated by the numeral 18. Any suitable heating element may be employed but I have diagrammatically illustrated a coiled heating element. The respective inner walls of the tubular members 11 and 12 are provided with an insulating material indicated at 19 which may be of any approved type, but preferably fire proof.

It will be noted from the above that the tubular members 11 and 12 are removably mounted in the casing 4 and are substantially at right angles to each other, the points of intersection of each of said tubular members being in substantial alinement with the longitudinal axis of the casing 4 and in the path of the flow of liquid therethrough, so that when liquid passes through the chamber 4 its path will be slightly broken or deflected by the heating elements causing a circulation of the liquid thereby effectively increasing the heating efficiency of the device, and the rapidity with which the liquid will be heated.

Each of the heating units 18 may be connected in any desirable manner, the same being indicated as connected in series by means of the short leads 20, the connections between the heating elements being so arranged as to terminate conveniently proximate to a connecting plug of any suitable design indicated by the numeral 21, the said connecting plug having the lead wires 22 associated therewith which may be connected to any suitable source of electrical energy.

From the above description it will be seen that the heating members 11 when in position deflect the liquid flowing through the casing 4 as set forth above insuring its thorough circulation and contact with all of the heating elements 11 and 12, and the peculiar arrangement of the securing nuts 14 affords a structure which is simple, compact, and cheap to manufacture. The facility with which these parts may be interchangeably arranged, repaired, and replaced is another of the advantageous features of my invention.

In order to protect the lead wires 20 from abuse I provide a protective shell 21 divided into two semicircular sections having flanges 22 complementally apertured for reception of securing bolts or the like 23. The opposite ends of the protective casing 21 are reduced as shown at 24 for snug engagement with the portions 1 and 3 of the conduit hereinbefore referred to.

From the above description taken in connection with the accompanying drawings, it is thought that a clear and comprehensive understanding of the construction, advantages, and use of my invention may be readily gathered and I desire to lay particular stress on the peculiar mounting and relative disposition of the tubular heating elements 11 and 12. While I have shown only two sets of these heating elements alternately relatively angularly disposed, it will be readily appreciated by those skilled in the art that any number of sets may be disposed in any number of different angles within the purview of a circle whereby to increase the circulation functions of the device.

While I have shown and described my invention as possessing a peculiar form and construction, it is desired that it be understood that I may make such changes in the details thereof that do not depart from the spirit and scope of the invention as claimed.

Having thus described my invention what I claim and desire to secure by Letters Patent is:

1. A liquid heater, including, in combination, a casing interposed in a liquid conduit, a plurality of heating members arranged diametrically of the casing and relatively angularly and alternately disposed, heating units in each of said members, and insulating and supporting means for carrying said heating members in the casing.

2. A liquid heater, including, in combination, a casing interposed in a liquid conduit, a plurality of heating members arranged diametrically within the casing and relatively angularly and alternately disposed, the opposite extremities of said members having insulating retaining caps for engagement with the peripheral outer surface of the casing to retain said members in position.

3. A liquid heater, including a casing interposed in a pipe line, a plurality of diametrically arranged relatively angularly and alternately disposed heating members therein, heating units in said members, and insulating end caps for detachable engagement with the free extremities of said members to engage the outer periphery of the casing for retention of said members in position.

In testimony whereof I affix my signature in presence of two witnesses.

FRED POOLE.

Witnesses:
 FRED V. KREAMER,
 A. C. ELY.